United States Patent [19]

Herd et al.

[11] Patent Number: 5,278,293

[45] Date of Patent: Jan. 11, 1994

[54] AZO DYESTUFFS AND INTERMEDIATE PRODUCTS FOR THEIR PREPARATION

[75] Inventors: Karl-Josef Herd, Odenthal-Holz; Manfred Hoppe, Kuerten; Hermann Henk, Cologne; Klaus Kunde, Neunkirchen-Seelscheid; Frank-Michael Stüohr, Odenthal, all of Fed. Rep. of Germany

[73] Assignee: Bayer Aktiengesellschaft, Leverkusen, Fed. Rep. of Germany

[21] Appl. No.: 606,409

[22] Filed: Oct. 31, 1990

[30] Foreign Application Priority Data

Dec. 6, 1989 [DE] Fed. Rep. of Germany ....... 3940266

[51] Int. Cl.$^5$ .............................................. C09B 62/47
[52] U.S. Cl. ..................... 534/643; 534/573; 534/583; 534/630; 534/632; 534/730; 534/752; 534/753; 534/775; 534/787; 534/788; 534/789; 534/795; 534/799; 534/829; 534/844; 534/845; 534/860
[58] Field of Search ............... 534/799, 844, 845, 860, 534/643, 752, 632, 753, 775, 787, 788

[56] References Cited

U.S. PATENT DOCUMENTS

| | | | |
|---|---|---|---|
| 3,435,023 | 3/1969 | Meininger et al. | 260/163 |
| 4,119,623 | 10/1978 | Hugl et al. | 260/206 |
| 4,424,155 | 1/1984 | Kurtz et al. | 260/157 |
| 4,994,563 | 2/1991 | Walter et al. | 534/728 |

FOREIGN PATENT DOCUMENTS

| | | |
|---|---|---|
| 0053750 | 6/1982 | European Pat. Off. . |
| 0915457 | 1/1963 | United Kingdom . |
| 1464947 | 2/1977 | United Kingdom . |
| 2031932 | 4/1980 | United Kingdom . |

*Primary Examiner*—Allen J. Robinson
*Assistant Examiner*—Deborah Lambkin
*Attorney, Agent, or Firm*—Sprung Horn Kramer & Woods

[57] ABSTRACT

Azo dyestuffs of the formula

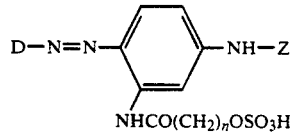

having the substituent meanings given in the description, are outstandingly suitable for dyeing and printing materials containing hydroxyl groups and amide groups.

4 Claims, No Drawings

AZO DYESTUFFS AND INTERMEDIATE PRODUCTS FOR THEIR PREPARATION

The present invention relates to azo dyestuffs of the formula

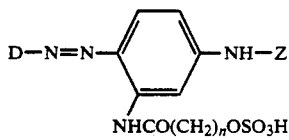

(1)

wherein
- D = a radical of a diazo component, preferably one of the benzene, naphthalene or hetaryl series,
- n = 1 or 2 and
- Z = H, an acyl radical which is not fibre-reactive, a fibre-reactive radical or a radical of the formula

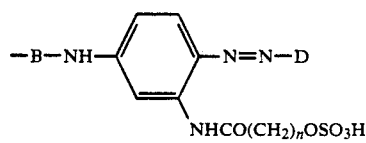

where B = a bridge member

Examples of suitable radicals D are those of the formulae (2) to (7):

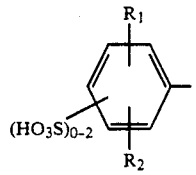
(2)

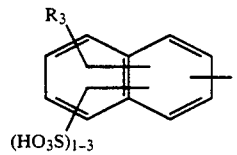
(3)

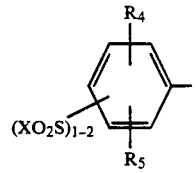
(4)

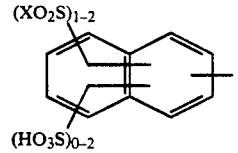
(5)

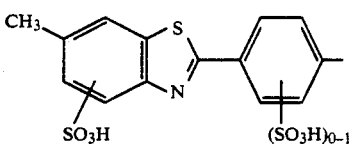
(6)

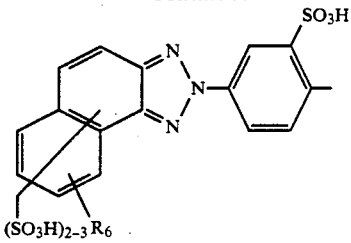
(7)

wherein
- $R_1$ = H, Cl, Br, F or optionally substituted $C_1$-$C_4$-alkyl, $C_1$-$C_4$-alkoxy, carbalkoxy, sulphonamide, sulphophenylazo or sulphonaphthylazo; or carboxyl or —NHZ,
- $R_2$ = H, Cl, Br, F or optionally substituted $C_1$-$C_4$-alkyl or $C_1$-$C_4$-alkoxy,
- $R_3$ H, Cl, OH, carboxyl or optionally substituted $C_1$-$C_4$-alkoxy, sulphophenylazo or sulphonaphthylazo,
- $R_4$ H, optionally substituted $C_1$-$C_4$-alkyl or $C_1$-$C_4$-alkoxy, F, Cl, Br, COOH or $SO_3H$,
- $R_5$ = H, optionally substituted $C_1$-$C_4$-alkyl or $C_1$-$C_4$-alkoxy, F, Cl or Br,
- $R_6$, H or —NHZ and
- X = —CH=CH$_2$ or —CH$_2$CH$_2$Y, wherein
- Y = a radical which can be eliminated under alkaline conditions.

Examples of suitable radicals Y are $OSO_3H$, $SSO_3H$, $OCOCH_3$, $OPO_3H_2$, $OSO_2C_1$-$C_4$-alkyl, SCN, NHSO$_2$C$_1$-C$_4$-alkyl, Cl, Br, F, OCOphenyl (optionally substituted), OSO$_2$phenyl (optionally substituted) and $\oplus N(C_1$-$C_4$-alkyl)$_4 Cl^\ominus$.

Examples of suitable acyl radicals which are not fibre-reactive are optionally substituted alkylcarbonyl, alkylsulphonyl, arylcarbonyl and arylsulphonyl radicals and formyl.

Suitable fibre-reactive radicals Z, that is to say those which react with the OH or NH groups of the fibres under dyeing conditions to form covalent bonds, are, in particular, those which contain at least one reactive substituent bonded to a 5- or 6-membered aromatic-heterocyclic ring, for example to a monoazine, diazine or triazine, in particular a pyridine, pyrimidine, pyridazine, pyrazine, thiazine, oxazine or asymmetric or symmetric triazine ring, or to such a ring system which contains one or more fused-on aromatic-carbocylic rings, for example a quinoline, phthalazine, cinnoline, quinazoline, quinoxaline, acridine, phenazine and phenanthridine ring system.

Examples which may be mentioned of the reactive substituents on the heterocyclic radical are halogen (Cl, Br or F), ammonium, including hydrazinium, pyridinium, picolinium, carboxypyridinium, sulphonium, sulphonyl, azido (N$_3$), thiocyanato, thiol ether, oxyether, sulphinic acid and sulphonic acid.

Specific examples which may be mentioned are: 2,4-difluorotriazin-6-yl, 2,4-dichlorotriazin-6-yl and monohalogeno-sym.-triazinyl radicals, in particular monochloro- and monofluorotriazinyl radicals which are substituted by alkyl, aryl, amino, monoalkylamino, dialkylamino, aralkylamino, arylamino, morpholino, piperidino, pyrrolidino, piperazino, alkoxy, aryloxy, alkylthio and arylthio, wherein alkyl preferably denotes optionally substituted $C_1$-$C_4$-alkyl, aralkyl preferably denotes optionally substituted phenyl-$C_1$-$C_4$-alkyl and aryl preferably denotes optionally substituted phenyl or naphthyl, and wherein preferred substituents for alkyl are halogen, hydroxyl, cyano, vinylsulphonyl, substituted alkylsulphonyl, dialkylamino, morpholino, $C_1$-$C_4$-alkoxy, vinylsulphonyl-$C_2$-$C_4$-alkoxy, substituted alkylsulphonyl-$C_2$-$C_4$-alkoxy, carboxyl, sulpho or sulphato, and preferred substituents for henyl and naphthyl are sulpho, $C_1$-$C_4$-alkyl, $C_1$-$C_4$-alkoxy, carboxyl, halogen, acylamino, vinyl-sulphonyl, substituted alkylsulphonyl, hydroxyl and amino.

The following radicals may be mentioned specifically: 2-amino-4-fluoro-triazin-6-yl, 2-methylamino-4-fluorotriazin-6-yl, 2-ethylamino-4-fluorotriazin-6-yl, 2-isopropylamino-4-fluoro-triazin-6-yl, 2-dimethylamino-4-fluorotriazin-6-yl, 2-diethylamino-4-fluoro-triazin-6-yl, 2-$\beta$-methoxy-ethylamino-4-fluoro-triazin-6-yl, 2-$\beta$-hydroxyethylamino-4-fluoro-triazin-6-yl, 2-di-($\beta$-hydroxyethylamino)-4-fluoro-triazin-6-yl, 2-$\beta$-sulphoethylamino4-fluoro-triazin-6-yl, 2-p-sulphoethyl-methylamino-4-fluoro-triazin-L-yl, 2-carboxymethylamino-4-fluoro-triazin- 6-yl, 2-di-(carboxymethylamino)-4-fluoro-triazin-6-yl, 2-sulphomethylmethylamino-4-fluoro-triazin-6-yl, 2-$\beta$-cyanoethylamino-4-fluoro-triazin-6-yl, 2-benzylamino-4-fluoro-triazin-6-yl, 2-$\beta$-phenylethylamino-4-fluorotriazin-6-yl, 2-benzyl-methylamino-4-fluoro-triazin-6-yl, 2-(4'-sulphobenzyl)-amino-4-fluoro-triazin-6-yl, 2-cyclohexylamino-4-fluoro-triazin-6-yl, 2-(o-, m- and p-methylphenyl)-amino-4-fluoro-triazin-6-yl, 2-(o-, m- and p-sulphophenyl)-amino-4-fluoro-triazin-6-yl, 2-(2',5'-disulphophenyl)-amino-4-fluoro-triazin-6-yl, 2-(o-, m- and p-chlorophenyl)-amino-4-fluoro-triazin-6-yl, 2-(o-, m- and p-methoxyphenyl)-amino-4-fluoro-triazin-6-yl, 2-(2'-methyl-4'-sulphophenyl)-amino-4-fluoro-triazin-6-yl, 2-(2'-methyl-5'-sulphophenyl)-amino-4-fluoro-triazin-6-yl, 2-(2'-chloro-4'-sulphophenyl)-amino-4-fluoro-triazin-6-yl, 2-(2'-chloro-5'-sulphophenyl)-amino-4-fluorotriazin-6-yl, 2-(2'-methoxy-4'-sulphophenyl)-amino-4-fluoro-triazin-6-yl, 2-(o-, m- and p-carboxyphenyl)-amino-4-fluoro-triazin-6-yl, 2-(2',4'-disulphophenyl)-amino-4-fluoro-triazin-6-yl, 2-(3',5'-disulphophenyl)-amino-4-fluoro-triazin-6-yl, 2-(2'-carboxy-4'-sulphophenyl)-amino-4-fluoro-triazin-6-yl, 2-(21-carboxy-5'-sulphophenyl)-amino-4-fluoro-triazin-6-yl, 2-(61-sulphonaphth-2'-yl)-amino-4-fluoro-triazin-6-yl, 2-(4',8'-disulphonaphth-2'-yl)-amino-4-fluoro-triazin-6-yl, 2-6',8'-disulphonaphth-2'-yl)-amino-4-fluoro-triazin-6-yl, 2-(N-methyl-N-phenyl)-amino-4-fluoro-triazin-6-yl, 2-(N-ethyl-N-phenyl)-amino-4-fluoro-triazin-6-yl, 2-(N-$\beta$-hydroxyethyl-N-phenyl)-amino-4-fluoro-triazin-6-yl, 2-(N-iso-propyl-N-phenyl)-amino-4-fluoro-triazin-6-yl, 2 -morpholino-4-fluorotriazin-6-yl, 2-piperidino-4-fluorotriazin-6-yl, 2-(4',6',8'-trisulphonaphth-2'-yl)-amino-4-fluoro-triazin-6-yl, 2-(3',6',8'-trisulphonaphth-2'-yl-amino-4-fluoro-triazin-6-yl, 2-(3',6'-disulphonaphth-1'-yl)-amino-4-fluoro-triazin-6-yl, N-methyl-N-(2,4-di-chlorotriazin-6-yl)-carbamyl , N-methyl-N-(2-methylamino-4-chlorotriazin-6-yl)-carbamyl , N-methyl-N-(2-dimethyl-amino-4-chlorotriazin-6-yl)-carbamyl , N-methyl- or N-ethyl-N-(2,4-dichlorotriazin-6-yl)-aminoacetyl-, 2-methoxy-4-fluoro-triazin-6-yl, 2-ethoxy-4-fluoro-triazin-6-yl, 2-phenoxy-4-fluoro-triazin-6-yl, 2-(o-, m- or p-sulphophenoxy)-4-fluoro-triazin-6-yl, 2-(o-, m- or p-methyl- or -methoxy-phenoxy)-4-fluoro-triazin-6-yl, 2-$\beta$-hydroxyethylmercapto-4-fluoro-triazin-6-yl, 2-phenylmercapto-4-fluoro-triazin-6-yl, 2-(4'-methylphenyl)mercapto-4-fluorotriazinyl-, 2-(2',4'-dinitrophenyl)mercapto-4-fluoro-triazin-6-yl, 2-methyl-4-fluoro-triazin-6-yl, 2-phenyl-4-fluoro-triazin-6-yl and the corresponding 4-chloro- and 4-bromotriazinyl radicals, and the corresponding radicals obtainable by halogen exchange with tertiary bases, such as trimethylamine, triethylamine, dimethyl-$\beta$-hydroxyethylamine, triethanolamine, N,N-dimethylhydrazine, pyridine, $\alpha$-, $\beta$- or $\gamma$-picoline, nicotinic acid or isonicotinic acid, sulphonates, in particular benzenesulphinic acid, or bisulphite.

The halogenotriazinyl radicals can also be linked to a second halogenotriazinyl radical or a halogenodiazinyl radical or one or more vinylsulphonyl or sulphatoethylsulphonyl radicals, for example via a bridge member

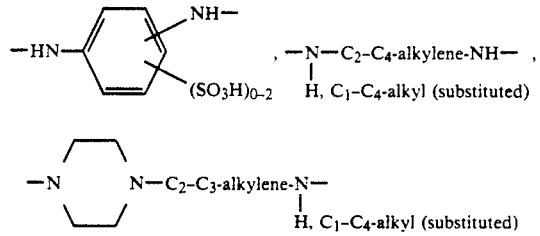

or int eh case of the sulphatoethylsulphonyl or vinylsulphonyl group via a bridge member

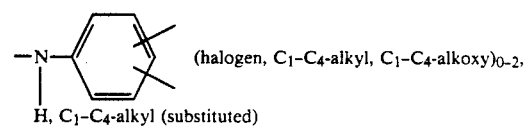

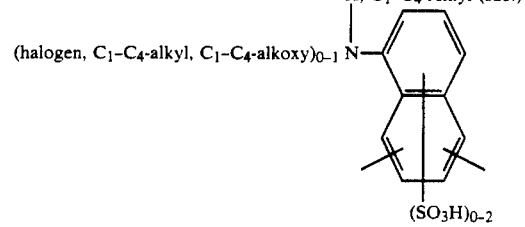

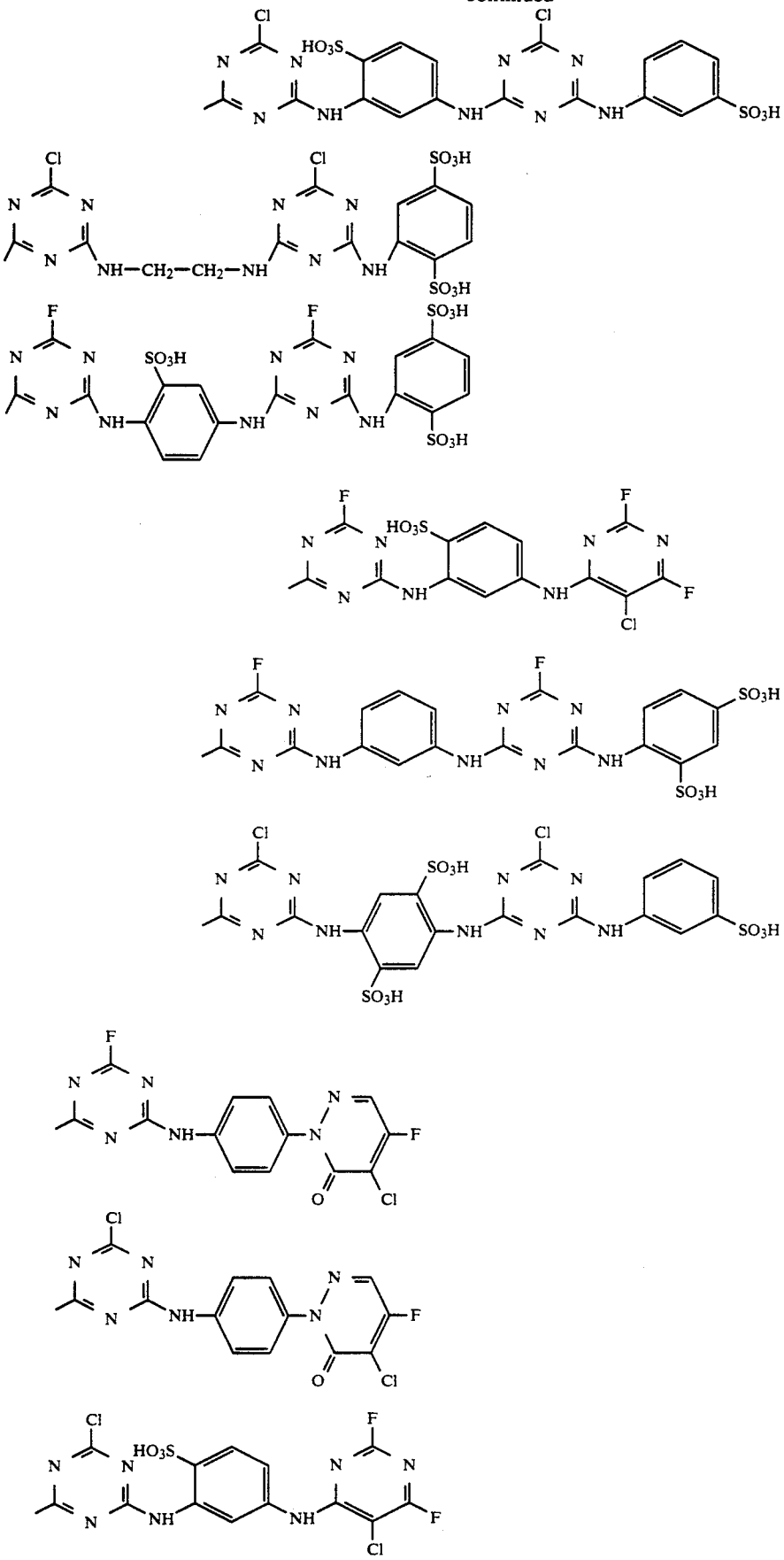

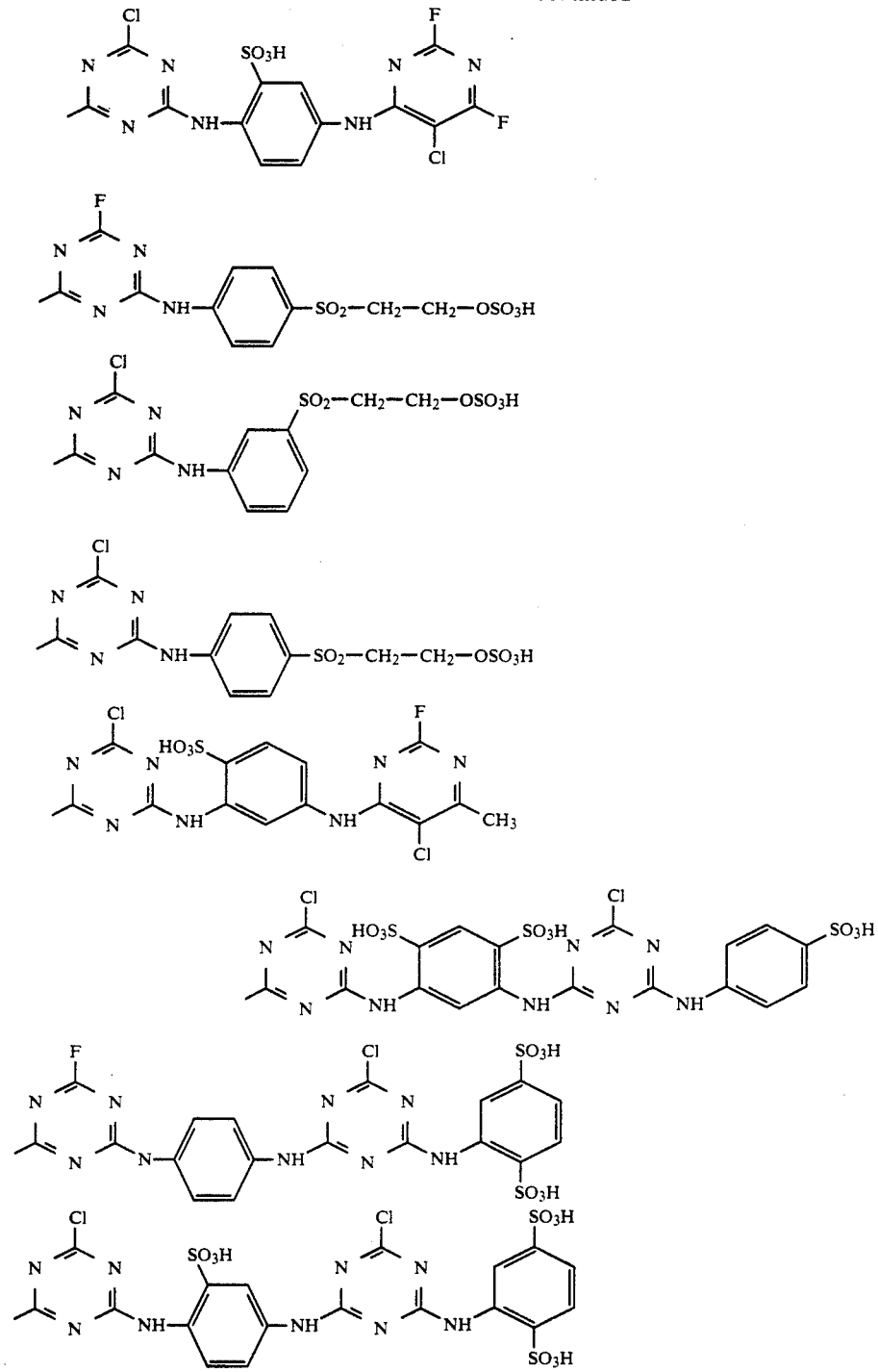

mono-, di- or trihalogenopyrimidinyl radicals, such as 2,4-dichloropyrimidin-6-yl-, 2,4,5-trichloropyrimidin-6-yl, 2,4-dichloro-5-nitro- or -5-methyl- or -5-carboxymethyl- or -5-carboxy- or -5-cyano- or -5-vinyl- or -5-sulpho- or -5-mono-, -di- or -trichloromethyl- or -5-carbalkoxy-pyrimidin-6-yl, 2,6-dichloropyrimidine-4-carbonyl, 2,4-dichloropyrimidine-5-carbonyl, 2-chloro-4-methyl-pyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulphonyl, 2-chloro-quinoxaline-3-carbonyl, 2- or 3-monochloroquinoxaline-6-carbonyl, 2- or 3-monochloroquinoxaline-6-sulphonyl, 2,3-dichloroquinoxaline-5- or -6-carbonyl, 2,3-dichloroquinoxaline-5- or -6-sulphonyl, 1,4-dichlorophthalazine-6-sulphonyl or -6-carbonyl, 2,4-dichloroquinazoline-7- or -6-sulphonyl or -carbonyl, 2- or 3- or 4-(4',5'-dichloropyridaz-6'-on-1'-yl)-phenylsulphonyl- or -carbonyl, fi-(4',5'-dichloropyridaz-6'-on-1'-yl)-ethylcarbonyl, N-methyl-N-(2,3-dichloroquinoxaline-6-sulphonyl)-aminoacetyl, N-methyl-N-(2,3-dichloroquinoxaline-6-carbonyl) -aminoacetyl and the corresponding bromine and fluorine derivatives of the abovementioned chlorine-substituted heterocyclic radicals, and amongst these, for example, 2-fluoro-4-pyrimidinyl-, 2,6-difluoro-4-pyrimidinyl-, 2,6-difluoro-5-chloro-4-pyrimidinyl-, 2-fluoro-5,6-dichloro-4-pyrimidinyl-, 2,6-difluoro-5-methyl-4-pyrimidinyl-, 2-fluoro-5-methyl-6-chloro-4-pyrimidinyl-, 2-fluoro-5-nitro-6-chloro-4-pyrimidinyl-, 5-bromo-2-fluoro-4-pyrimidinyl-, 2-fluoro-5-cyano-4-pyrimidinyl-, 2-fluoro-5-methyl-4-pyrimidinyl-, 2,5,6-trifluoro-4-pyrimidinyl-, 5-chloro-6-chloromethyl-2-fluoro-4-pyrimidinyl-, 5-chloro-6-dichloromethyl-2-fluoro-4-pyrimidinyl-, 5-chloro-6-trichloromethyl-2-fluoro-4-pyrimidinyl-, 5-chloro-2-chloromethyl-6-fluoro-4-pyrimidinyl-, 5-chloro-2-dichloromethyl-6-fluoro-4-pyrimidinyl-, 5-chloro-2-trichloromethyl-6-fluoro-4-pyrimidinyl-, 5-chloro-2-fluorodichloromethyl-6-fluoro-4-pyrimidinyl-, 2,6-difluoro-5-bromo-4-pyrimidinyl-, 2-fluoro-5-bromo-6-methyl-4-pyrimidinyl-, 2-fluoro-5-bromo-6-chloromethyl-4-pyrimidinyl-, 2,6-difluoro-5-chloromethyl-4-pyrimidinyl-, 2,6-difluoro-5-nitro-4-pyrimidinyl-, 2-fluoro-6-methyl-4-pyrimidinyl-, 2-fluoro-5-chloro-6-methyl-4-pyrimidinyl-, 2-fluoro-5-chloro-4-pyrimidinyl-, 2-fluoro-6-chloro-4-pyrimidinyl-, 6-trifluoromethyl-5-chloro-2-fluoro-4-pyrimidinyl-, 6-trifluoromethyl-2-fluoro-4-pyrimidinyl-, 2-fluoro-5-nitro-4-pyrimidinyl-, 2-fluoro-5-trifluoromethyl-4-pyrimidinyl-, 2-fluoro-5-phenyl- or -5-methylsulphonyl-4-pyrimidinyl-, 2-fluoro-5-carboxamido-4-pyrimidinyl-, 2-fluoro-5-carbomethoxy-4-pyrimidinyl-, 2-fluoro-5-bromo-6-trifluoromethyl-4-pyrimidinyl-, 2-fluoro-6-carbonamido-4-pyrimidinyl-, 2-fluoro-6-carbomethoxy-4-pyrimidinyl-, 2-fluoro-6-phenyl-4-pyrimidinyl-, 2-fluoro-6-cyano-4-pyrimidinyl-, 5-chloro-6-fluoro-2-methyl-4-pyrimidinyl-, 5,6-difluoro-2-trifluoromethyl-4-pyrimidinyl-, 5-chloro-6-fluoro-2-dichlorofluoromethyl-4-pyrimidinyl-, 2-fluoro-5-chloropyrimidin-4-yl, 2-methyl-4-fluoro-5-methyl-sulphonylpyrimidine-6-yl, 2,6-difluoro-5-methyl-sulphonyl-4-pyrimidinyl-, 2,6-dichloro-5-methylsulphonyl-4-pyrimidinyl, 2-fluoro-5-sulphonamido-4-pyrimidinyl-, 2-fluoro-5-chloro-6-carbomethoxy-4-pyrimidinyl- and 2,6-difluoro-5-trifluoromethyl-4-pyrimidinyl; triazine radicals containing sulphonyl groups, such as 2,4-bis-(phenylsulphonyl)-triazin-6-yl-, 2-(3'-carboxyphenyl)-sulphonyl-4-chlorotriazin-6-yl-, 2-(3'-sulphophenyl)sulphonyl-4-chlorotriazin-6-yl- and 2,4-bis-(3'-carboxyphenylsulphonyl)-triazin-6-yl; pyrimidine rings containing sulphonyl groups, such as 2-carboxymethylsulphonyl-pyrimidin-4-yl, 2-methylsulphonyl-6-methylpyrimidin-4-yl, 2-methylsulphonyl-6-ethyl-pyrimidin-4-yl, 2-phenylsulphonyl-5-chloro-6-methyl-pyrimidin-4-yl, 2,6-bis-methylsulphonyl-pyrimidin-4-yl, 2,6-bis-methylsulphonyl-5-chloro-pyrimidin-4-yl, 2,4-bis-methylsulphonyl-pyrimidine- 5-sulphonyl, 2-methylsulphonylpyrimidin-4-yl, 2-phenylsulphonyl-pyrimidin-4-yl, 2-trichloromethylsulphonyl-6-methyl-pyrimidin-4-yl, 2-methylsulphonyl-5-chloro-6-methyl-pyrimidin-4-yl, 2-methylsulphonyl-5-bromo-6-methyl-pyrimidin-4-yl, 2-methylsulphonyl-5-chloro-6-ethyl-pyrimidin-4-yl, 2-methylsulphonyl-5 -chloro-6 -chloromethyl-pyrimidin-4 -yl, 2-methylsulphonyl-4-chloro-6-methylpyrimidine-5-sulphonyl, 2-methylsulphonyl-5-nitro-6-methylpyrimidin-4-yl, 2,5,6-tris-methylsulphonyl-pyrimidin-4-yl, 2-methylsulphonyl-5,6-dimethyl-pyrimidin-4-yl, 2-ethylsulphonyl-5-chloro-6-methyl-pyrimidin-4-yl, 2-methylsulphonyl-6-chloro-pyrimidin-4-yl, 2,6-bis-methylsulphonyl-5-chloropyrimidin-4-yl, 2-methylsulphonyl-6-carboxypyrimidin-4-yl, 2-methylsulphonyl-5-sulpho-pyrimidin-4-yl, 2-methylsulphonyl-6-carbomethoxy-pyrimidin-4-yl, 2-methylsulphonyl-5-carboxy-pyrimidin-4-yl, 2-methylsulphonyl-5-cyano-6-methoxy-pyrimidin-4-yl, 2-methylsulphonyl-5-chloro-pyrimidin-4-yl, 2-p-sulphoethylsulphonyl-6-methylpyrimidin-4-yl, 2-methylsulphonyl-5-bromo-pyrimidin-4-yl, 2-phenylsulphonyl-5-chloro-pyrimidin-4-yl, 2-carboxymethylsulphonyl-5-chloro-6-methyl-pyrimidin-4-yl, 2-methylsulphonyl-6-chloropyrimidine-4- and -5-carbonyl, 2,6-bis-(methylsulphonyl)-pyrimidine-4- or -5-carbonyl, 2-ethylsulphonyl-6-chloropyrimidine-5-carbonyl, 2,4-bis-imethylsulphonyl) -pyrimidine-5-sulphonyl and 2-methylsulphonyl-4-chloro-6-methylpyrimidine-5-sulphonyl or -carbonyl; 2-chlorobenzothiazole-5- or -6-carbonyl or -5- or -6-sulphonyl, 2-arylsulphonyl- or alkylsulphonylbenzothiazole-5- or -6-carbonyl or -5- or -6-sulphonyl, such as 2-methylsulphonyl- or 2-ethylsulphonyl-benzothiazole-5- or -6-sulphonyl or -carbonyl, 2-phenylsulphonylbenzothiazole-5- or -6-sulphonyl or -carbonyl and the corresponding 2-sulphonylbenzothiazole-5- or -6-carbonyl or -sulphonyl derivatives containing sulpho groups in the fused-on benzene ring, 2-chlorobenzoxazole-5- or -6-carbonyl- or -sulphonyl-, 2-chlorobenzimidazole-5- or -6-carbonyl- or -sulphonyl-, 2-chloro-1-methylbenzimidazole-5- or -6-carbonyl- or -sulphonyl-, 2-chloro-4-methyl-1,3-thiazole-5-carbonyl- or -4- or -5-sulphonyl-, and the N-oxide of 4-chloro- or 4-nitroquinoline-5-carbonyl.

Reactive groups of the aliphatic series may furthermore be mentioned, such as the acryloyl, mono-, di- or trichloroacryloyl, such as —CO—CH=CH—Cl, —CO—CCl=CH$_2$, —CO—CCl=CH—CH$_3$, —CO—CCl=CH—COOH, —CO—CH=C-Cl—COOH, p-chloropropionyl, 3-phenylsulphonylpropionyl, 3-methylsulphonylpropionyl, 2-fluoro-2-chloro-3,3-difluorocyclobutane-1-carbonyl, 2,2,3,3-tetrafluorocyclobutane-1-carbonyl or -1-sulphonyl, β-(2,2,3,3-tetrafluorocyclobut-1-yl) -acryloyl, α- or β-bromoacryloyl or α- or β-alkyl- or -arylsulphonylacryloyl, such as α- or β-methylsulphonylacryloyl, chloroacetyl, vinylsulphonyl, —SO$_2$CH$_2$CH$_2$Z wherein Z is a group which can be split off under alkaline conditions, in particular —OSO$_3$H, —OCOCH$_3$, Cl, Br, F, —S-SO$_3$H, —OPO$_3$H$_2$, —OCOC$_6$H$_5$, di-C$_1$-C$_4$-alkylamino, quaternary ammonium, in particular —N⊕(C$_1$-C$_4$-alkyl)$_3$X$^{61}$, —OSO$_2$CH$_3$, —SCN, —NH—SO$_2$CH$_3$, —OSO$_2$—C$_6$H$_4$—CH$_3$, —OSO$_2$—C$_6$H$_5$, —OCN,

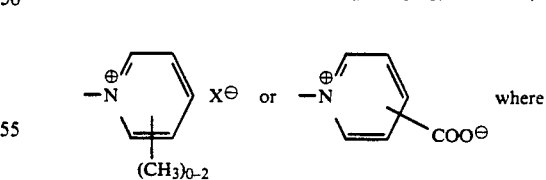

X$^{63}$=an anion, for example —OSO$_3$H, —SSO$_3$H, —OPO$_3$H$_2$, —Cl, —Br, —F, —SCN, —OCN, —OSO$_2$CH$_3$, —OSO$_2$C$_6$H$_5$, OCOCH$_3$, —I, —OSO$_2$OCH$_3$, —OSO$_2$C$_6$H$_4$CH$_3$, —OCOC$_6$H$_5$.

Reactive dyestuffs of the formula (1) in which Z denotes a pyrimidinyl, methylpyrimidinyl or triazinyl radical are preferred.

Examples of suitable radicals B are —CO—, —SO$_2$—, —COCO—, —CO-aliphatic radical-CO—, —CO-aromatic radical-CO—,

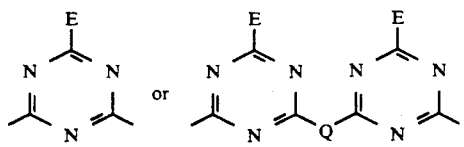

wherein aliphatic radical preferably represents optionally substituted $C_1$–$C_6$-alkylene or —CH=CH—, aromatic radical preferably represents optionally substituted phenylene, E represents halogen (Cl, Br or F), optionally substituted $C_1$–$C_6$-alkoxy, optionally substituted phenoxy or $NR_7R_8$ (where $R_7$ and $R_8$=H, optionally substituted $C_1$–$C_6$-alkyl, cycloalkyl, optionally substituted phenyl, naphthyl or hetaryl) or —$NR_7R_8$ =

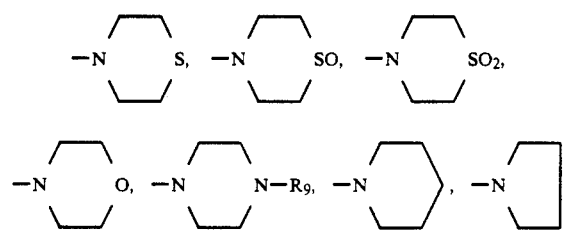

wherein the heterocyclic rings are optionally further substituted, for example by 1–2 $C_1$–$C_4$-alkyl or $C_1$–$C_4$-alkoxy, and $R_9$=H, optionally substituted $C_1$–$C_6$-alkyl (substituents are, in particular OH, $SO_3H$, $OSO_3H$ and COOH) and

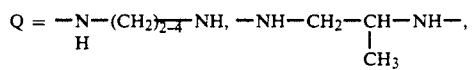

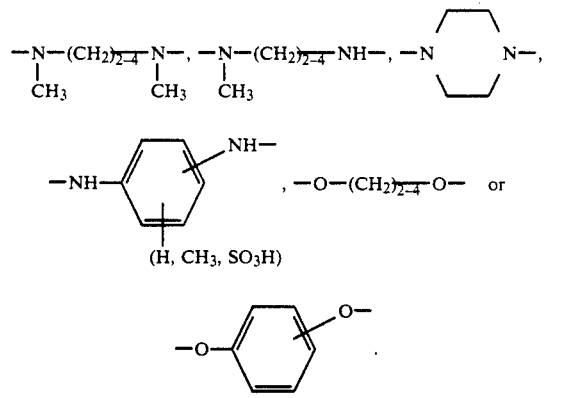

Examples of possible substituents for alkyl radicals are: Cl, OH, $SO_3H$, $OSO_3H$, COOH, $SO_2CH_2CH_2OSO_3H$, $C_1$–$C_4$-alkoxy and phenyl (substituents are, for example, $SO_3H$, COOH, $SO_2CH_2CH_2OSO_3H$; CN or acylamino, in particular $C_1$–$C_4$-alkylcarbonylamino)

Substituents which may be mentioned for the phenyl and naphthyl radicals are: $SO_3H$, COOH, $C_1$–$C_4$-alkyl, $C_1$–$C_4$-alkoxy, OH, Cl, $SO_2CH_2CH_2OSO_2H$ and acylamino.

Diazo components containing 1 to 2 groups —$SO_2X$ which may be mentioned are: aniline-4-β-sulphatoethylsulphone, aniline-4-β-thiosulphatoethylsulphone, aniline-4-vinylsulphone, aniline-4-β-chloroethylsulphone, aniline-3-β-sulphatoethylsulphone, aniline-3-β-vinylsulphone, 2-methoxy-aniline-5-β-sulphatoethylsulphone, 2-methoxy-aniline-5-β-thiosulphatoethylsulphone, 2-methoxy-aniline-5-vinylsulphone, 4-methoxy-aniline-3-β-sulphatoethylsulphone, 4-methoxyaniline-3-β-vinylsulphone, 2,5-dimethoxy-aniline-4-β-sulphoatoethylsulphone, 2,5-dimethoxy-aniline-4-vinylsulphone, 2,5-dimethoxy-aniline-4-β-sulphatoethylsulphone, 2-methoxy-5-methyl-aniline-4-β-sulphatoethylsulphone, aniline-2-β-sulphatoethylsulphone, 2-chloroaniline-5-β-sulphatoethylsulphone, 4-chloroaniline-3-β-sulphatoethylsulphone, 3-(3- or 4-aminobenzoyl)-amino-phenyl-β-sulphatoethylsulphone, 2-methoxy-5-methylaniline-4-vinylsulphone, 6-carboxy-aniline-3-β-sulphatoethylsulphone, 6-carboxy-aniline-3-vinylsulphone, 2-sulphoaniline-4-p-sulphatoethylsulphone, 2-sulphoaniline-4-vinylsulphone, 2,4-disulphoaniline-5-vinylsulphone, 2-hydroxyaniline-5-p-sulphatoethylsulphone, 2-hydroxyaniline-4-β-sulphatoethylsulphone, 3-sulpho-2-hydroxyaniline-5-β-sulphatoethylsulphone, 2-naphthylamine-8-β-sulphatoethylsulphone, 2-naphthylamine-6-β-sulphatoethylsulphone, 1-sulpho-2-naphthylamine-6-β-sulphatoethylsulphone, 1-naphthylamine-4-β-sulphatoethylsulphone, 1-sulpho-2-naphthylamine-5-β-sulphatoethylsulphone, 6-sulpho-2-naphthylamine-8-β-sulphatoethylsulphone, 2-amino-3-sulphonaphthalene-6,8-bis-(β-sulphatoethylsulphone), 2-bromo-1-aminobenzene-4-β-sulphatoethylsulphone, 2,6-dichloro-1-aminobenzene-4-β-sulphatoethylsulphone, 1-naphthylamine-5-β-sulphatoethylsulphone, 2-naphthylamine-5-β-sulphatoethylsulphone, 2-naphthylamine-8-β-sulphatoethylsulphone and 8-sulpho-2-naphthylamine-6-β-sulphatoethylsulphone.

Preferred dyestuffs (1) are those where
Z=a fibre-reactive radical of the pyrimidinyl or triazinyl series, in particular those of the formula

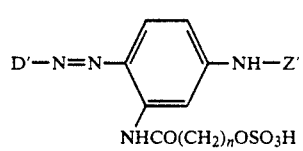

wherein n=1 or 2

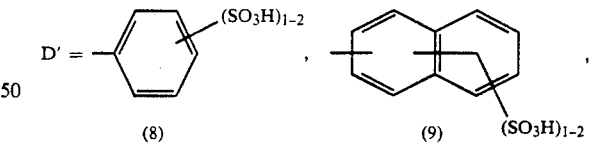

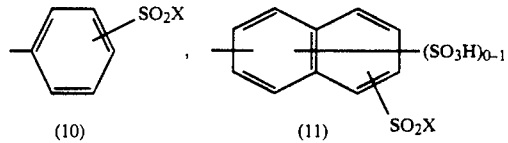

and

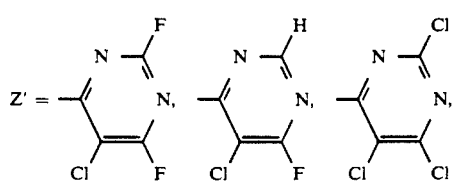

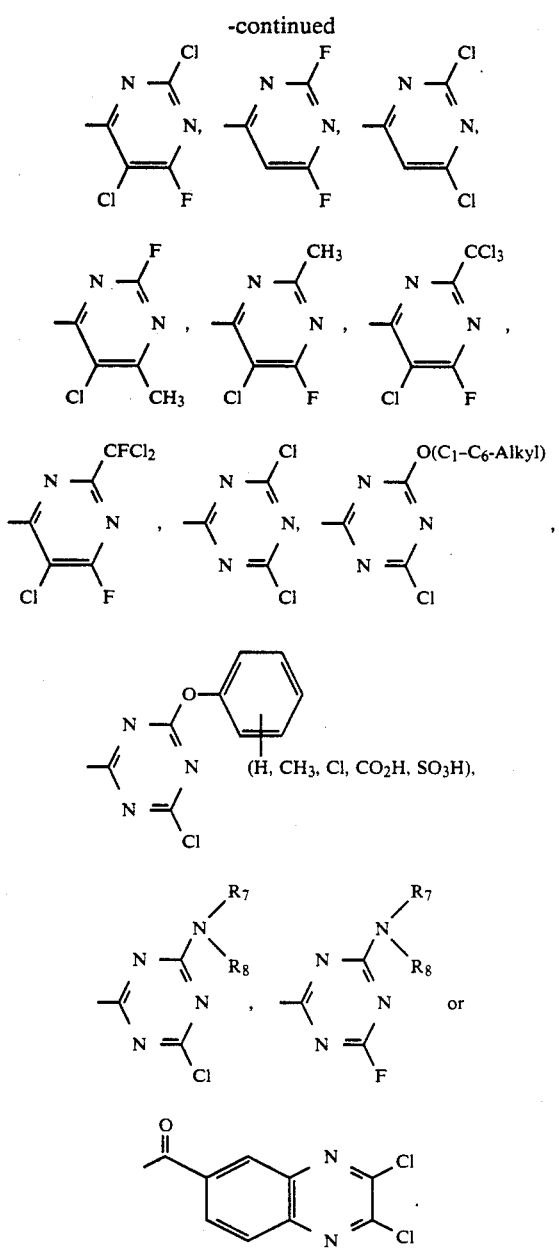

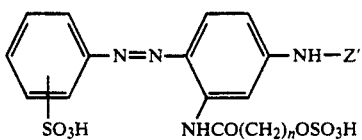

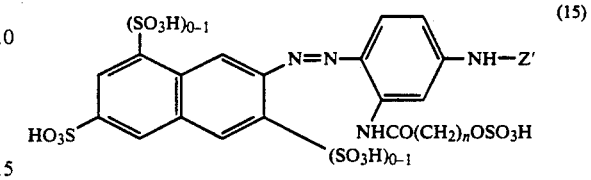

The new dyestuffs of the formula (1) can be obtained by the preparation processes customary in reactive dyestuff chemistry. According to these, diazo components $D-NH_2$ are diazotized and the diazotization products are coupled to the coupling component of the formula

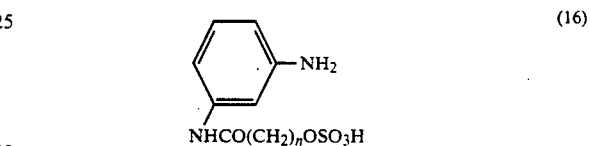

Aminoazo compounds of the formula

result. Because of the sulphato radical which confers water-solubility, (16) is an interesting coupling component for azo dyestuffs. The preparation is carried out by esterifying the known hydroxy compounds

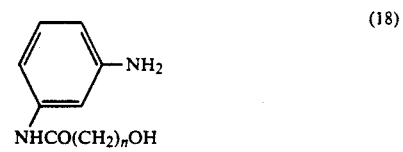

with sulphuric acid, oleum or sulphur trioxide in a manner which is known per se.

The dyestuffs (17) can be acylated to dyestuffs (1) by acylation with acylating agents.

Examples of suitable acylating agents are reactive derivatives of corresponding aliphatic or aromatic carboxylic acids or sulphonic acids, $COCl_2$, $SO_2Cl_2$, $ClCOCOCl$ or the corresponding dihalogenotriazine compounds or the reactive heterocyclic compounds on which the fibre-reactive radicals Z are based and which contain at least two reactive groupings, preferably Cl or F.

The dyestuffs (1) can also be prepared by sulphation of dyestuffs of the formula Preferred dyestuffs of the formula (1a) are those of the formulae (12) to (15)

wherein $X'=CH=CH_2$ or $CH_2CH_2OSO_3H$,

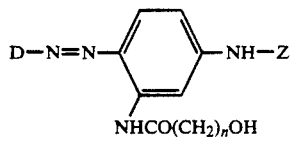

(19)

with oleum, sulphuric acid or $SO_3$ in a manner which is known per se.

The new dyestuffs are suitable for dyeing and printing materials containing hydroxyl and amide groups, in particular cellulose materials. Reactive dyestuffs are distinguished by a high reactivity and a high degree of fixing. The dyeings or prints obtainable with these dyestuffs on cellulose materials are moreover distinguished by a high fibre-dyestuff bond stability and by an outstanding stability towards oxidizing agents, such as detergents containing peroxide or chloride. The ability with which the hydrolysis products formed to only a slight degree during dyeing or printing can be washed out is excellent. The dyestuffs have a very good water-solubility and excellent combination properties.

The formulae stated are those of the free acids. The salts, in particular the alkali metal salts, such as sodium salts, potassium salts or lithium salts, are in general obtained in the preparation.

The dyestuffs can be employed either as solid formulations or as concentrated solutions.

EXAMPLE 1

23.6 g of 7-amino-1,3-naphthalenedisulphonic acid mono-sodium salt are stirred in 150 ml of water/50 g of ice and 20 ml of concentrated hydrochloric acid, and 17 ml of an aqueous sodium nitrite solution (300 g of $NaNO_2$/l) are added dropwise at 5°–10° C. The diazotization has ended after 1.5 hours. The slight excess of nitrite is destroyed by addition of sulphamic acid.

17.8 g of N-(3-aminophenyl)sulphatoacetamide are stirred in 100 ml of water and the mixture is brought to pH 6.5–7.5 by addition of solid sodium bicarbonate. 50 g of ice are added to this solution and the above diazonium salt mixture is then metered in over a period of 30 minutes. During this addition, the pH is kept constant at 6.0–6.2 by addition of solid sodium bicarbonate. The temperature should not exceed 10° C. The coupling solution is subsequently stirred for 30 minutes and 14 g of 5-chloro-2,4,6-trifluoropyrimidine are then added at 10°–15° C. and pH 6.2. During the condensation reaction, the pH is kept constant at 6.2–6.5 by addition of 20% strength sodium carbonate solution. The reaction has ended after about 1 hour. After addition of 5 g of active charcoal, the dyestuff solution is clarified by filtration and the product is then salted out with 60 g of sodium chloride. The dyestuff which has precipitated is filtered off with suction and dried. It has the structure

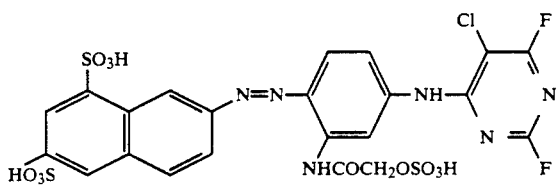

($\lambda_{max}$=394 nm ($H_2O$)) and dyes cotton in brilliant golden yellow colour shades.

Varying the diazo component and reactive component and using N-(3-aminophenyl)-2-sulphatopropionamide instead of the analogous acetamide derivative from Example 1 leads to further useful golden yellow reactive dyestuffs according to the above preparation instructions:

TABLE 1

D-N=N-⟨⟩-NH-Z
    |
  NHCO(CH₂)ₙ—OSO₃H

| Example | n | D | Z | $\lambda_{max}$ |
|---|---|---|---|---|
| 2 | 2 | 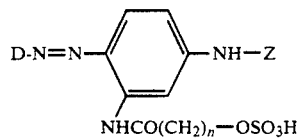 | ![F,N,Cl,F pyrimidine] | 396 nm |
| 3 | 1 | " | ![N,N,Cl,F pyrimidine] | 402 nm |
| 4 | 1 | " | ![phenyl-acyl Cl,Cl pyrazine] | |

TABLE 1-continued

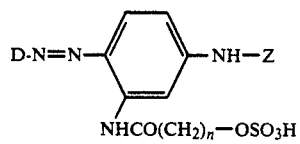

NHCO(CH$_2$)$_n$—OSO$_3$H

| Example | n | D | Z | $\lambda_{max}$ |
|---|---|---|---|---|
| 5 | 1 | 6-methyl-2-naphthalenesulfonic acid (HO$_3$S-naphthyl-) | 2-F, 5-Cl, 6-F pyrimidinyl | |
| 6 | 2 | " | " | |
| 7 | 1 | 1,5-disulfo-3-methylnaphthyl | " | 393 nm |
| 8 | 1 | " | 5-Cl, 6-F pyrimidinyl | 399 nm |
| 8 | 1 | 2-methylbenzenesulfonic acid | 2-F, 5-Cl, 6-F pyrimidinyl | 362 nm |
| 10 | 1 | 4-sulfophenyl | 2-F, 5-Cl, 6-F pyrimidinyl | |
| 11 | 1 | HO$_3$S—OCH$_2$CH$_2$SO$_2$—phenyl- | " | 382, 460 (sh) nm |
| 12 | 2 | HO$_3$S—OCH$_2$CH$_2$SO$_2$—phenyl- (meta) | 2-F, 5-Cl, 6-F pyrimidinyl | |
| 13 | 1 | 2-methyl-5-methyl benzenesulfonic acid | 5-Cl, 6-F pyrimidinyl | |

TABLE 1-continued

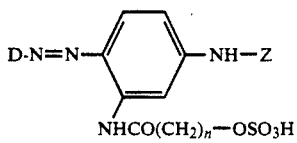

| Example | n | D | Z | $\lambda_{max}$ |
|---|---|---|---|---|
| 14 | 1 | naphthalene with SO₃H groups and CH₃ | triazine with 2 Cl | |
| 15 | 1 | benzothiazole with CH₃, SO₃H, and phenyl-SO₃H-CH₃ | pyrimidine with 2 F, Cl | |
| 16 | 1 | HO₃SOCH₂CH₂SO₂—phenyl—CH₃ | pyrimidine with F, Cl | |
| 17 | 2 | '' | '' | |
| 18 | 1 | '' | pyrimidine with F, Cl, CH₃ | |
| 19 | 1 | naphthotriazole with SO₃H, HO₃S, and phenyl-SO₃H-CH₃ | pyrimidine with 2 F, Cl | |

EXAMPLE 20

23.6 g of 7-amino-1,3-naphthalenedisulphonic acid mono-sodium salt are diazotized analogously to Example 1 and coupled to 17.8 g of N-(3-aminophenyl)-sulphatoacetamide. The orange-red coupling solution is cooled to 0° C. by addition of ice, and 11 g of 2,4,6-trifluorotriazine are added at pH 6.2–6.5. During the condensation reaction the pH is kept constant at 6.5 with sodium carbonate solution. The reaction has ended after 10–15 minutes. A solution of 13.4 g of morpholine hydrogen sulphate in 50 ml of water is added, the pH is kept constant at 7.5–8.0 by addition of sodium carbonate solution and the mixture is warmed slowly to room temperature. The second condensation reaction is subsequently stirred for 1 hour and the dyestuff is salted out by addition of 40 g of sodium chloride and 40 g of potassium chloride. Isolation and drying gives a bright red dyestuff powder of the formula

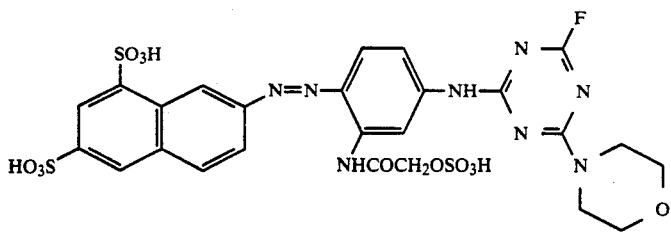

($\lambda_{max}$=400, 460(sh)nm), which dyes cotton in brilliant, very fast golden yellow colour shades.

Varying the diazo component or using various amines instead of the morpholine leads to further interesting yellow to golden yellow reactive dyestuffs:

TABLE 2

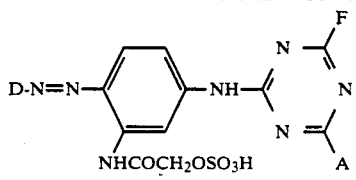

| Example | D | A | $\lambda_{max}$ |
|---|---|---|---|
| 21 | 1-SO₃H, 6-HO₃S naphthyl (7-) | −N(piperidine) | 402, 460 (sh) nm |
| 22 | " | −N(pyrrolidine) | 402, 460 (sh) nm |
| 23 | 6-HO₃S naphthyl | −N−morpholine (O) | |
| 24 | 6-HO₃S naphthyl | −N(pyrrolidine) | |
| 25 | " | −N(CH₃)−CH₂CH₂OH | |
| 26 | 1,4-(SO₃H)₂ naphthyl (7-) | −N(C₆H₅)(C₂H₅) | |
| 27 | " | −N(piperazine)N−CH₂CH₂OH | |
| 28 | 4-HO₃S−C₆H₄− | −N(C₆H₅)(CH₃) | |

TABLE 2-continued

Structure: D−N=N−[phenyl with NHCOCH$_2$OSO$_3$H]−NH−C(=N−)−N=C(F)−N=C(A)− (triazine with F and A substituents)

| Example | D | A | $\lambda_{max}$ |
|---|---|---|---|
| 29 | HO$_3$SOCH$_2$CH$_2$SO$_2$−[phenyl]− | −N(morpholino)O | |
| 30 | " | −NH−CH$_2$CH$_2$OH | |
| 31 | " | −N(CH$_3$)CH$_2$CH$_2$−SO$_3$H | |

Useful dyestuffs are furthermore obtained if trichlorotriazine (cyanuric chloride) is now used instead of trifluorotriazine for the examples in Table 2 and Example 20 and the condensation is carried out with various amines an hydroxy compounds analogously to Example 20:

TABLE 3

Structure: D−N=N−[phenyl with NHCOCH$_2$OSO$_3$H]−NH−C(=N−)−N=C(Cl)−N=C(A)− (triazine with Cl and A substituents)

| Example | D | A |
|---|---|---|
| 32 | 7-methyl-naphthalene-1-SO$_3$H, 3-HO$_3$S (naphthalene with SO$_3$H and HO$_3$S) | −N(morpholino)O |
| 33 | " | −N(CH$_3$)−phenyl |
| 34 | " | −NH−[phenyl]−SO$_2$CH$_2$CH$_2$OSO$_3$H (meta) |
| 35 | " | −NH−[phenyl]−SO$_2$CH$_2$CH$_2$OSO$_3$H (para) |
| 36 | " | −O−CH(CH$_3$)$_2$ |
| 37 | " | −O−phenyl |
| 38 | 6-methyl-naphthalene-2-SO$_3$H (HO$_3$S-naphthalene) | N(CH$_2$CH$_2$OH)$_2$ |

TABLE 3-continued

Structure:

D−N=N−[benzene ring with NHCOCH₂OSO₃H]−NH−[triazine with Cl, N, A substituents]

| Example | D | A |
|---------|---|---|
| 39 | " | −NH−⟨benzene⟩−SO₂CH₂CH₂SO₃H |
| 40 | naphthalene with SO₃H (1,5-positions) and 7-methyl attachment | −N⟨piperidine⟩ |
| 41 | naphthalene with SO₃H (1,5-positions) and 7-methyl attachment | −N(−⟨phenyl⟩)−CH₂−CH₂OH |
| 42 | " | −O−⟨phenyl⟩ |
| 43 | " | −N(−C₂H₅)−⟨benzene−SO₂CH₂CH₂OSO₃H⟩ |
| 44 | HO₃SOCH₂CH₂SO₂−⟨m-benzene⟩− | −N⟨morpholine⟩O |
| 45 | HO₃SOCH₂CH₂SO₂−⟨benzene⟩− | −NH−⟨benzene⟩−SO₂CH₂CH₂SO₃H |
| 46 | " | −NH−⟨benzene⟩−SO₂CH₂CH₂OSO₃H |

EXAMPLE 47

32.5 g of 7-amino-3-(2-sulphatoethylsulphonyl)-1-naphthalenesulphonic acid mono-potassium salt are stirred in 150 ml of water/20 g of ice and 20 ml of dilute sulphuric acid (48% strength) and diazotized with 18 ml of an aqueous sodium nitrite solution (300 g of NaNO₂/l) at 10°–15° C. in the course of 15 minutes. The mixture is stirred at 15° C. for a further hour to bring the reaction to completion. The slight excess of nitrite is removed by addition of sulphamic acid.

17.8 g of N-(3-aminophenyl)sulphatoacetamide are suspended in 100 ml of water and dissolved at pH 7.0 by addition of solid sodium bicarbonate. 50 g of ice are added to this solution and the above diazonium salt suspension is then metered over a period of 30 minutes. During this addition, the PH is kept constant at 6.0–6.2 with solid sodium bicarbonate. The temperature is kept between 5°-10° C. by occasional addition of ice. After a further 30 minutes at pH 6.2 and 10° C., an orange-red solution of the azo compound of the formula

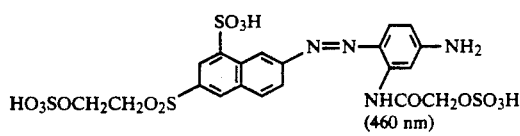
(460 nm)

results.

This compound is also accessible by coupling diazotized 7-amino-3-(2-sulphatoethylsulphonyl)-1-naphthalenesulphonic acid (see above) to an equimolar amount of N-(3-aminophenyl)hydroxyacetamide and sulphating the intermediate product of the formula

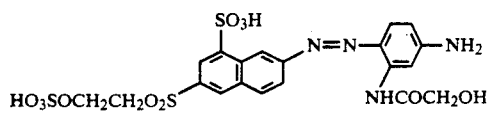

For this, for example, 40 g of dry intermediate product are introduced into 60 ml of 98% strength sulphuric acid at 20°-25° C. and the reaction mixture is stirred at 25° C. for 2 hours and poured onto 300 g of ice/100 ml of water.

The product which has precipitated is isolated by filtration and then dissolved in 250 ml of water at pH 7-8.

The orange-red coupling solution is warmed to 17°-18° C. and condensation is carried out with 14 g of 5-chloro-2,4,5-trifluoropyrimidine at pH 6.5. During this reaction, the pH is kept constant at 6.5-7.0 by addition of 20% strength sodium carbonate solution. The reaction has ended after about 1 hour. 5 g of active charcoal are added and the mixture is clarified over a suction filter. The orange-yellow solution is salted out with 50 g of sodium chloride. After a subsequent stirring time of 1 hour, the precipitate is isolated by filtration with suction and dried. The orange-red dyestuff powder has the structure

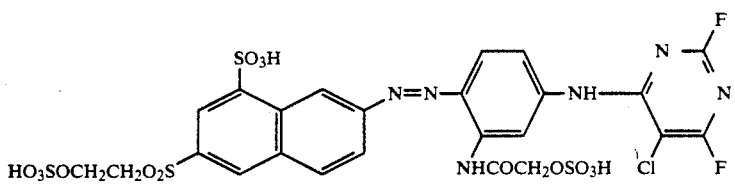

($\lambda_{max}$=404, 470 (sh)run) and dyes cotton in golden yellow colour shades with a high degree of fixing.

EXAMPLE 48

18.2 g of 2-amino-6-(2-hydroxyethylsulphonyl)naphthalene are diazotized analogously to the diazotization in Example 47 and the diazotization product is coupled to 12.0 g of N-(3-aminophenyl)hydroxyacetamide. During this procedure, the coupling product of the structure

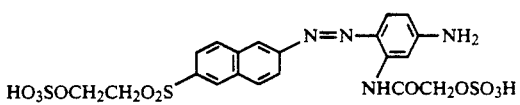

precipitates as an orange-red solid. After isolation and drying, 29.5 g of a powder results, which is now introduced into 60 ml of sulphuric acid monohydrate. During this procedure, the temperature should not exceed 30° C. The reaction solution is stirred at 20°-25° C. for 4 hours and then poured onto 250 g of ice/50 ml of water. The dyestuff which has precipitated, of the structure is isolated by filtration with suction. The moist paste is suspended in 250 ml of water and dissolved at pH 6.5-7.0 by addition of sodium carbonate solution. The mixture is cooled to 0° C. with ice and 11 g of 2,4,6-trifluorotriazine are added, the pH being kept constant at 6.5 with sodium carbonate solution during the condensation reaction. The reaction has ended after 10-15 minutes. A solution of 11.8 g of 2-methylamino-ethanesulphonic acid sodium salt in 50 ml of water is added, the pH is kept constant at 8. 0 by means of sodium carbonate solution and the mixture is warmed slowly to room temperature. The second condensation reaction has ended after about 1 hour. The dyestuff is salted out with 30 g of potassium chloride and isolated. After drying, 45 g of a salt-containing bright red dyestuff powder of the formula

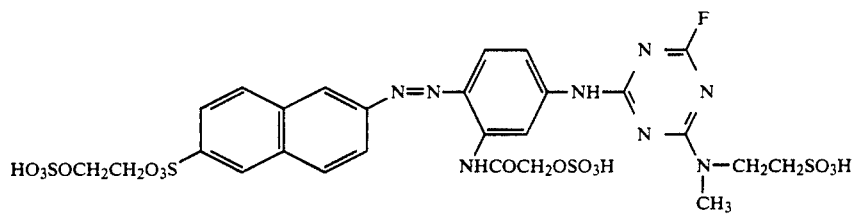

are obtained.

Other useful golden yellow bifunctional reactive dyestuffs are accessible analogously to Example 47 and 48 by varying the reaction component and the amine radical:

TABLE 4

Structure:
- Naphthalene bearing $(SO_3H)_m$ at one position and $HO_3SOCH_2CH_2O_2S-$ at another, linked via $-N=N-$ to a phenyl ring substituted with $-NH-Z$ and $-NHCO(CH_2)_n-OSO_3H$

| Example | m | n | Z | λmax |
|---|---|---|---|---|
| 49 | 1 | 1 | 5-chloro-6-fluoro-4-methylpyrimidin-2-yl | 411, 460 (sh) nm |
| 50 | 1 | 2 | '' | '' |
| 51 | 1 | 1 | 4-fluoro-6-methyl-2-(morpholin-4-yl)-1,3,5-triazin-2-yl | 410, 460 (sh) nm |
| 52 | 1 | 1 | 4-fluoro-6-methyl-2-[N-(2-hydroxyethyl)-N-methylamino]-1,3,5-triazin-2-yl | '' |
| 53 | 1 | 2 | 4-fluoro-6-methyl-2-[N-(2-hydroxyethyl)-N-methylamino]-1,3,5-triazin-2-yl | |
| 54 | 1 | 1 | 4-fluoro-6-methyl-2-(NHCH$_2$CO$_2$H)-1,3,5-triazin-2-yl | |
| 55 | 1 | 1 | 4-chloro-6-methyl-2-[NH-C$_6$H$_4$-SO$_2$CH$_2$CH$_2$OSO$_3$H]-1,3,5-triazin-2-yl | |
| 56 | 0 | 1 | '' | |
| 57 | 1 | 1 | 2-fluoro-5-chloro-4,6-dimethylpyrimidin-? | |

TABLE 4-continued

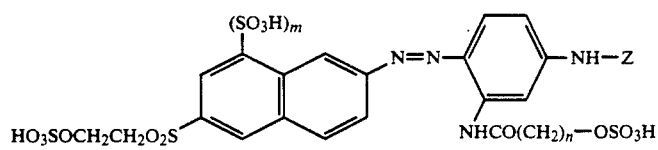

| Example | m | n | Z |
|---------|---|---|---|
| 58 | 1 | 1 | (triazine with F, and NHCH$_2$CH$_2$OCH$_2$CH$_2$SO$_2$CH$_2$CH$_2$Cl) |
| 59 | 1 | 1 | (triazine with Cl, and NHCH$_2$CH$_2$OSO$_3$H) |
| 60 | 0 | 1 | " |
| 61 | 0 | 2 | (triazine with F, and N(CH$_3$)—CH$_2$CO$_2$H) |
| 62 | 0 | 1 | (triazine with F, and NH—C$_6$H$_4$—SO$_3$H) |
| 63 | 0 | 1 | (triazine with F, and NH—C$_6$H$_4$—CO$_2$H) |

New interesting golden yellow reactive dyestuffs are also obtained by condensation of the fibre-reactive colour bases, such as, for example, those from Example 47 or 48, with phosgene, cyanuric chloride or other acylating agents which are not fibre-reactive.

EXAMPLE 64

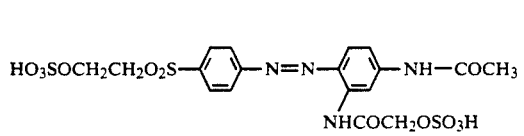

EXAMPLE 65

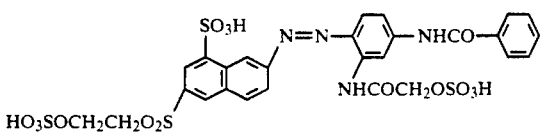

EXAMPLE 66
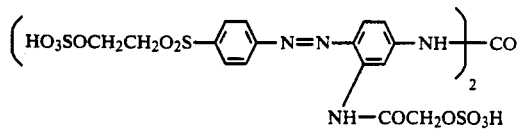
EXAMPLE 67
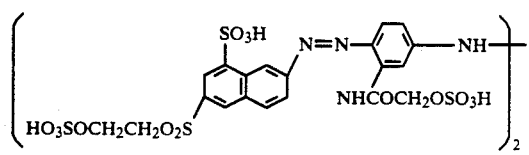
EXAMPLE 68
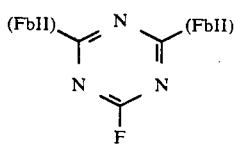
wherein (FbII) =
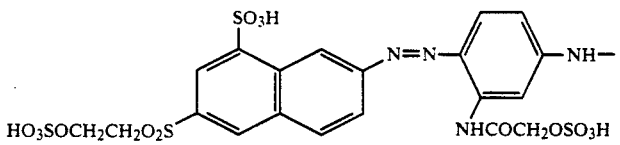
EXAMPLE 69
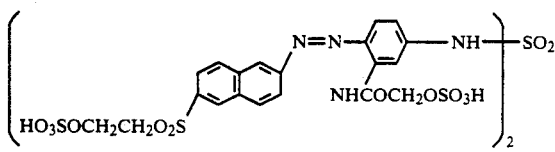
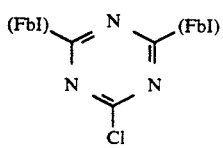
wherein (FbI) =
EXAMPLE 70
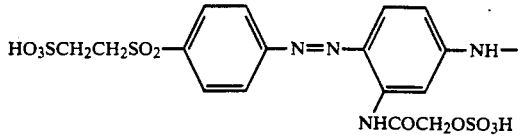
EXAMPLE 71
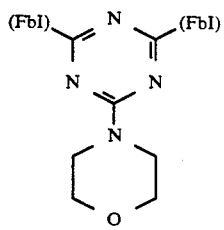
EXAMPLE 72
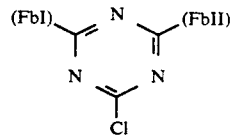
EXAMPLE 73
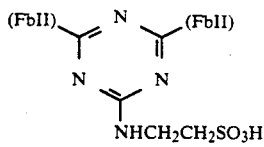
If colour bases which are not fibre-reactive are used, new interesting direct dyestuffs for dyeing cotton are obtainable by condensation with phosgene, cyanuric chloride, terephthaloyl chloride and the like, such as, for example
EXAMPLE 74

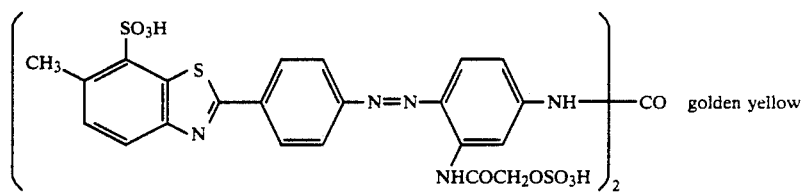
EXAMPLE 75
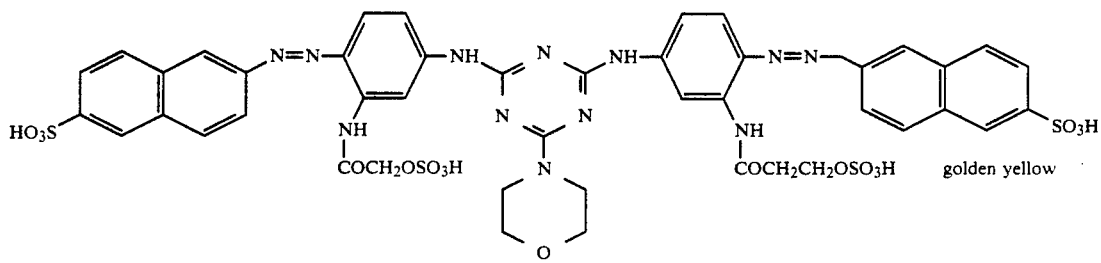
EXAMPLE 76
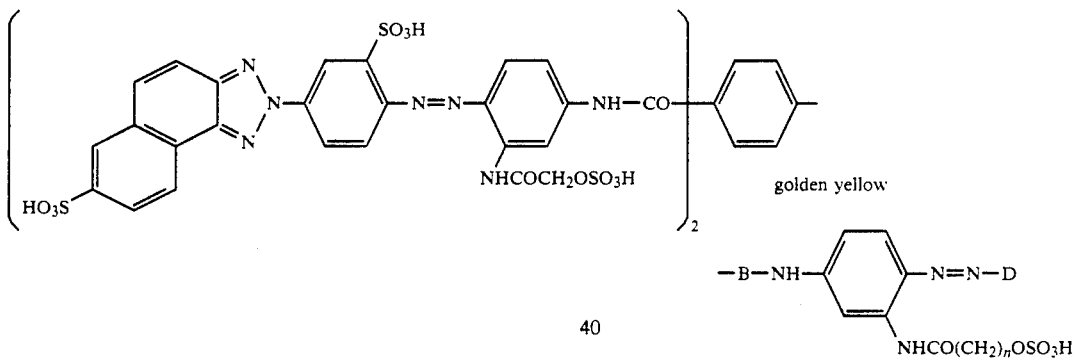
EXAMPLE 77
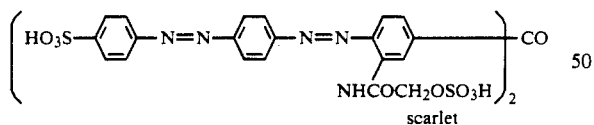
We claim:
1. A water soluble azo dyestuff of the formula
wherein
n is 1 or 2
Z is H, formyl, an alkylcarbonyl, alkylsulphonyl, arylcarbonyl or arylsulphonyl radical, a fiber-reactive radical, or a radical of the formula
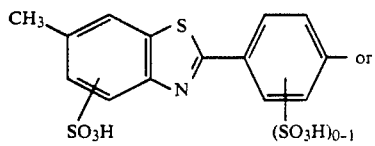
wherein
B is a bridge member, and
D is
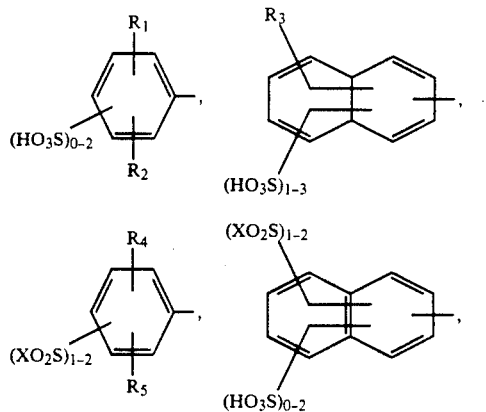

-continued

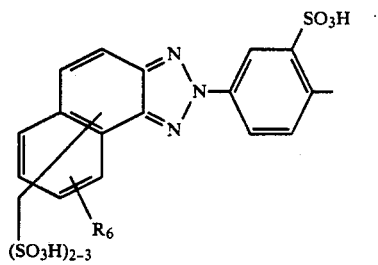

wherein
R¹ is H, Cl, Br, F or optionally substituted $C_1$-$C_4$-alkyl, $C_1$-$C_4$alkoxy, carbalkoxy, sulphonamido, sulphophenylazo or sulphonaphthylazo; or carboxyl or —NHZ, R² is H, Cl, Br, F or optionally substituted $C_1$-$C_4$-alkyl or $C_1$-$C_4$alkoxy, R₃ is H, Cl, OH, carboxyl or $C_1$-$C_4$-alkoxy, sulphophenylazo or sulphonaphthylazo, R₄ is H, optionally substituted $C_1$-$C_4$-alkyl or $C_1$-$C_4$-alkoxy, F, Cl, Br, COOH or SO₃H, R₅ is H, optionally substituted $C_1$-$C_4$-alkyl or $C_1$-$C_4$-alkoxy, F, Cl or BR, R₆ is H or —NHZ, and X is —CH=CH₂ or —CH₂CH₂Y, and Y is a radical which can be eliminated under alkaline conditions, wherein the optional substituents are Cl, OH, SO₃H, COOH, SO₂CH₂CH₂OSO₃H, $C_1$-$C_4$-alkoxy, phenyl, CN or $C_1$-$C_4$-alkylcarbonylamino.

2. A dyestuff according to claim 1, wherein Z is a fiber-reactive pyrimidinyl or triazinyl radical.

3. A dyestuff according to claim 1, wherein D is

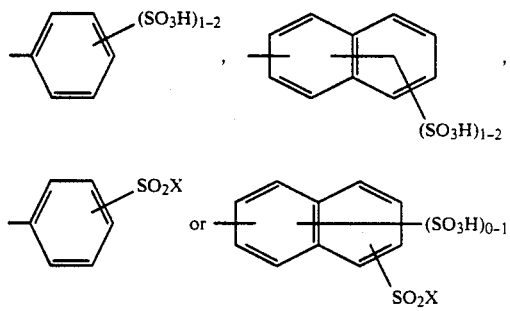

and Z is

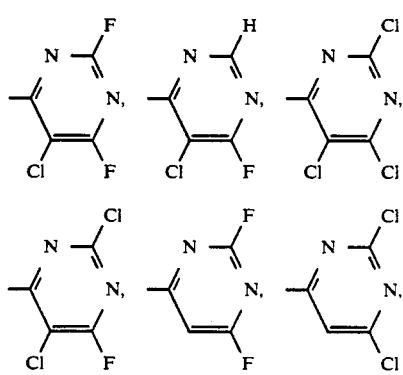

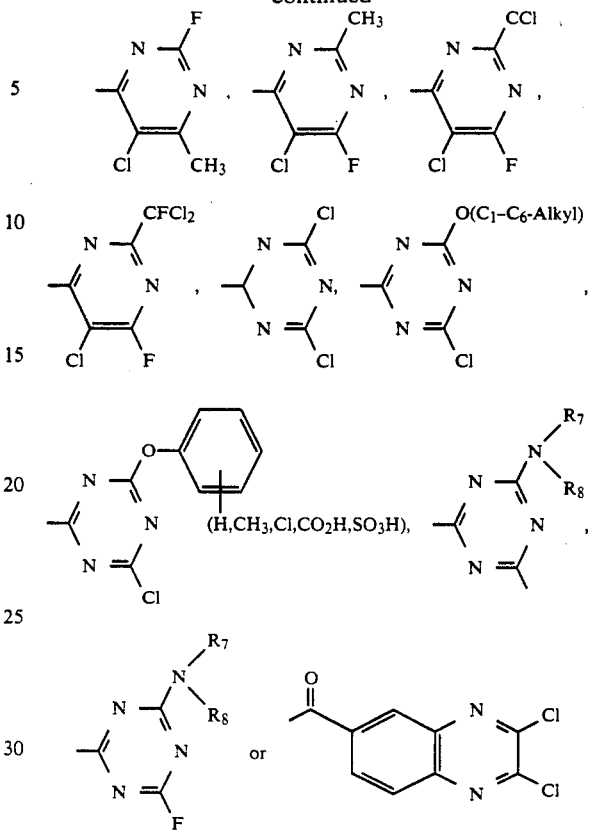

wherein
R₇ and R₈ each independently is H, optionally substituted $C_1$-$C_6$-alkyl, cycloalkyl, optionally substituted phenyl, naphthyl or hetaryl, or
NR₇R₈ is

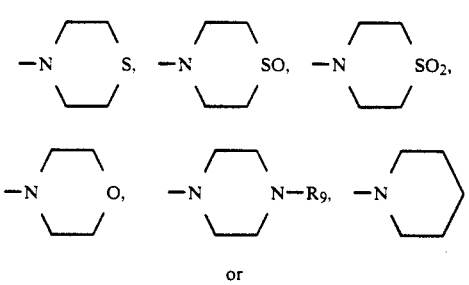

where R₈ is H or optionally substituted $C_1$-$C_6$-alkyl, and wherein the heterocyclic rings mentioned are optionally substituted.

4. A dyestuff according to claim 1, of the formula

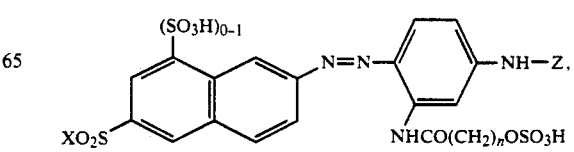

-continued
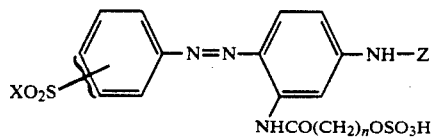
wherein
X is CH=CH$_2$ or CH$_2$CH$_2$OSO$_3$H,
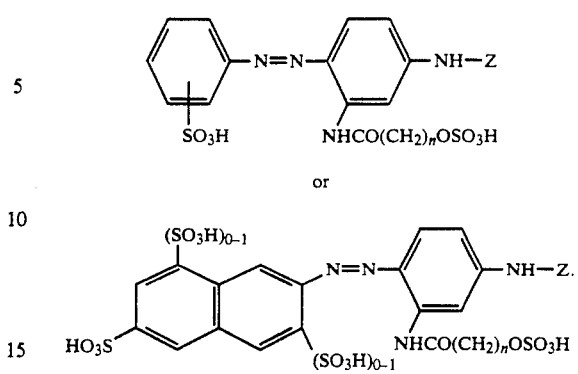
* * * * *